United States Patent [19]

Nihei et al.

[11] Patent Number: 5,493,192
[45] Date of Patent: Feb. 20, 1996

[54] ABNORMAL LOAD DETECTION METHOD

[75] Inventors: Ryo Nihei, Fujiyoshida; Yasuo Naito, Oshino; Kazuhisa Otsuka, Oshino; Tetsuaki Kato, Oshino; Hideki Sugiyama, Oshino, all of Japan

[73] Assignee: Fanuc Ltd, Yamanashi, Japan

[21] Appl. No.: 84,181

[22] PCT Filed: Oct. 10, 1992

[86] PCT No.: PCT/JP92/01391

§ 371 Date: Jun. 28, 1993

§ 102(e) Date: Jun. 28, 1993

[87] PCT Pub. No.: WO93/08958

PCT Pub. Date: May 13, 1993

[30] Foreign Application Priority Data

Oct. 29, 1991 [JP] Japan ................... 3-308214

[51] Int. Cl.$^6$ ................................. G05B 19/407
[52] U.S. Cl. ............... 318/568.2; 318/610; 318/432
[58] Field of Search ................... 318/568.2, 568.22, 318/609, 610, 432–434, 568.12

[56] References Cited

U.S. PATENT DOCUMENTS

| | | | |
|---|---|---|---|
| 4,925,312 | 5/1990 | Onaga et al. | 318/568.22 X |
| 4,956,594 | 9/1990 | Mizuno et al. | 318/568.22 X |

FOREIGN PATENT DOCUMENTS

| | | |
|---|---|---|
| 3810691A1 | 10/1988 | Germany . |
| 1-310889 | 2/1990 | Japan . |
| 2-146602 | 8/1990 | Japan . |
| 3-196313 | 11/1991 | Japan . |
| 4-023015 | 5/1992 | Japan . |
| WO90/08987 | 8/1990 | WIPO . |

OTHER PUBLICATIONS

Patent Abstracts of Japan, vol. 8, No. 28 (M–0274) 7 Feb. 1984 & JP–A–58 186 538 (Toyoda Koki K.K.) 31 Oct. 1983 *abstract*.
Patent Abstracts of Japan, vol. 15, No. 83 (P–1171) 26 Feb. 1991 & JP–A–02 297 603 (Fanuc) 10 Dec. 1990 *abstract*.
Patent Abstracts of Japan, vol. 14, No. 532 (M–1051) 22 Nov. 1990 & JP–A–02 224 990 (Fujitsu Ltd) 6 Sep. 1990 *abstract*.

*Primary Examiner*—Brian Sircus
*Attorney, Agent, or Firm*—Staas & Halsey

[57] ABSTRACT

A method for accurately detecting an abnormal load caused, e.g., by adhesion of the distal end of a spot gun. A flag F2 is set to "1" when a move command is outputted to move a movable part of a machine and is reset to "0" upon lapse of a predetermined very short period of time, and, while the flag F2 remains "0" during stoppage of the movable part, a disturbance torque T0, estimated by a disturbance estimation observer, is stored and successively updated. When a move command is thereafter outputted, and the flag F2 is set to "1", an estimated disturbance torque T1 is obtained, and if the absolute value |T1−T0| of the difference between the disturbance torque T1 and the disturbance torque T0, estimated immediately before the movable part is moved, is greater than a reference value Ts, it is determined that an abnormal load is applied, whereupon an alarm is outputted, a flag F1 is set to "1", and the motion is stopped. The disturbance torque T0 estimated during stoppage indicates a value of the load then acting on the movable part, such as gravity. Consequently, the value |T1−T0| represents a disturbance torque during movement of the movable part, which is free from the influence of gravity, and a comparison between this value and the reference value Ts permits accurate detection of a force acting on the movable part, not including gravity or frictional force, whereby the occurrence of adhesion or the like can be accurately detected.

4 Claims, 5 Drawing Sheets

ABNORMAL LOAD DETECTION METHOD

TECHNICAL FIELD

This invention relates to an abnormal load detection method for detecting a collision of a moving part and an obstacle, adhesion of a welding robot, etc., in a machine using a servomotor as a primary drive source, such as a robot, machine tool or the like.

BACKGROUND ART

When a moving part (table, etc.) of a machine tool or an arm of a robot collides with an obstacle, a servomotor for actuating the moving part or the arm produces a large torque so as to move the same according to a move command. Thus, in some cases, the moving part or the arm mechanism is damaged. To avoid damaging of mechanical parts of a machine, there has been proposed a method in which a position deviation of a servo system is detected, and when the position deviation becomes larger than a preset value, it is determined that an abnormal load is applied, i.e., a collision has occurred, and a method in which the drive current of a servomotor is detected, and when the drive current becomes larger than a preset value, it is determined that a collision has occurred. However, in these methods wherein collision or the like is detected based on an increase of the position deviation or the drive current, the servomotor is already producing a large torque at the time the collision is detected, and there still is a possibility of the mechanism being damaged by a large force.

In view of the foregoing, the applicant of the present application has proposed a method wherein a disturbance torque is estimated by a disturbance estimation observer, and when the estimated disturbance torque has become larger than a preset value, it is determined that the load is abnormal, i.e., collision or the like is occurring (cf. Unexamined Japanese Patent Publication No. 3-196313). The disturbance torque is the torque variation due to a collision of an arm, etc. The collision of the arm is detected by the disturbance estimation observer which is applied to a digital servo system.

However, in the case of estimating the disturbance torque by the aforesaid disturbance estimation observer, the estimated disturbance torque includes a gravity term, a kinetic friction term, etc., and a true external force arising from collision or the like cannot be detected. Particularly in a welding robot or the like, the orientation of the robot varies according to welding positions, and the influence of gravity is largely dependent on the orientation. That is, when the robot maintains a certain orientation, the servomotor, as the drive source, outputs a force resisting gravity so as to retain the orientation.

In carrying out spot welding by means of a welding robot, if adhesion to a weld or the like occurs at the transfer of welding spots (when the robot is moved toward a next welding point, and adhesion of the electrode tip to the weld in the current welding point occurs), it is very difficult to detect a subtle change in load caused by such adhesion when the aforesaid conventional abnormal load detection method, using the disturbance estimation observer, is employed.

Figure 7:
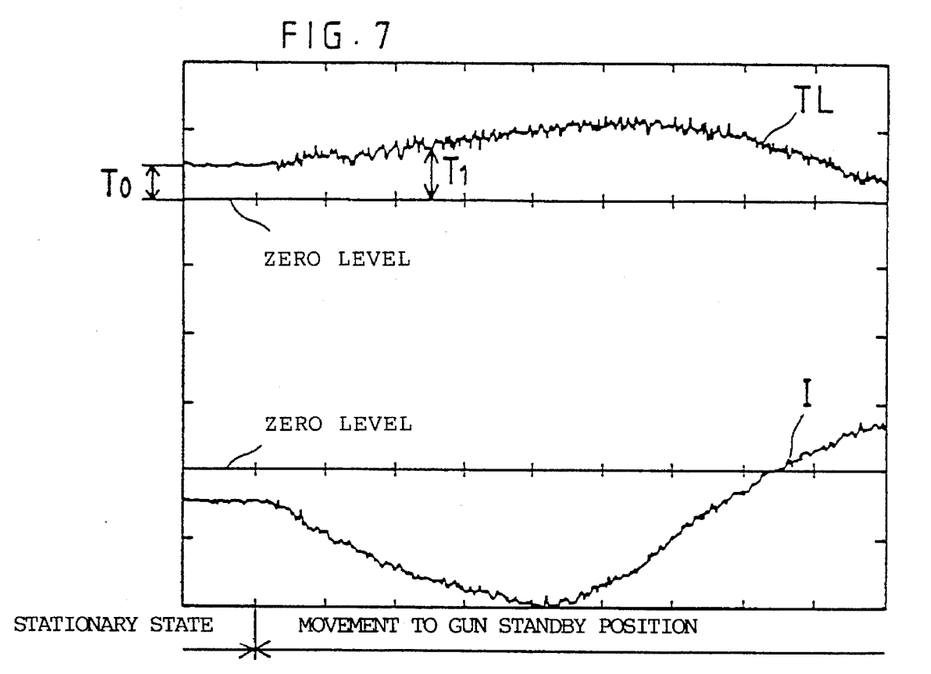
FIG. 7 is a graph showing a torque command and a disturbance torque measured during one second in which a longitudinal axis of a spot welding robot is moved after spot welding (in the case where the distal end of a spot gun does not adhere to a weld)
Figure 8:
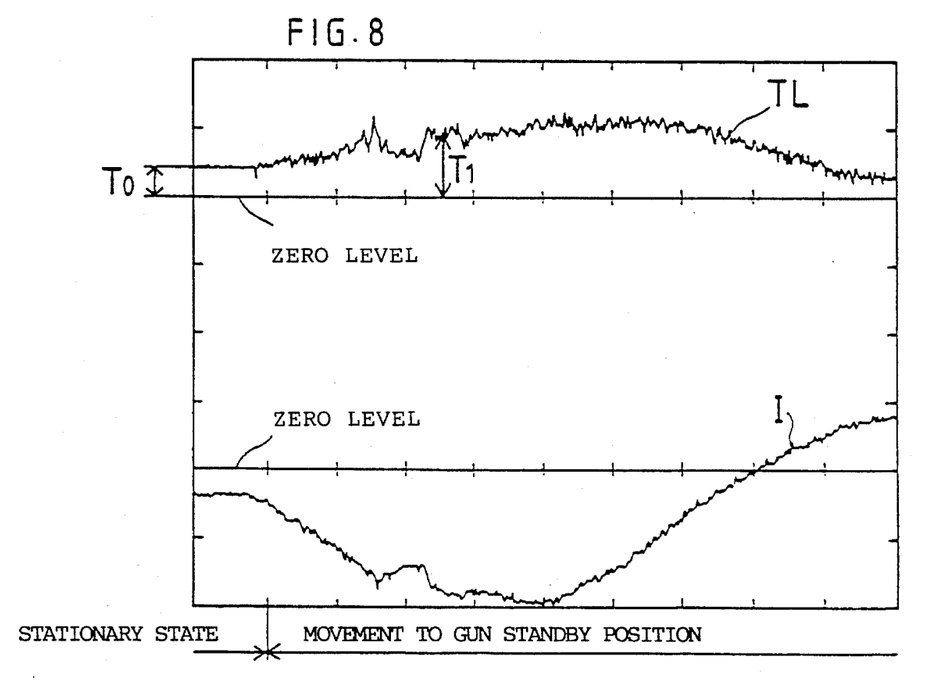
FIG. 8 is graph showing a torque command and a disturbance torque measured during one second in which the longitudinal axis of the spot welding robot is moved after spot welding (in the case where the distal end of the spot gun adheres to a weld).

FIGS. 7 and 8 are graphs showing the results of experiments, wherein an arm of a spot welding robot is held stationary for a while after spot welding and then is returned to a standby position. Each of the graphs shows a change of a torque command Tc (in the figures, a current value I, output to a servomotor as the torque command Tc, is plotted) for a longitudinal axis which actuates the robot arm, and a change of a disturbance torque TL acting upon the axis, during a period of one second. The abscissa indicates time (one graduation corresponds to 100 msec), and the ordinate indicates voltage representing torque values (one graduation corresponds to 1 V). FIG. 7 illustrates a case wherein the distal end of a spot gun is moved without the adhesion to a weld after spot welding, and FIG. 8 illustrates a case wherein the distal end of the gun has adhered to a weld. As seen from FIGS. 7 and 8, fluctuation of the disturbance torque, which is not observed in FIG. 7, is observed in the case of FIG. 8 when the distal end of the spot gun starts moving. However, a comparison between FIGS. 7 and 8 reveals that there is only a slight difference in the estimated disturbance torques T1 after a lapse of a predetermined time from the start of movement of the movable part (in the examples of FIGS. 7 and 8; after a lapse of 350 msec), and this difference is very small relative to a disturbance torque T0, which varies depending on the state during which the robot is at rest. Accordingly, with the conventional method using the total disturbance torque, inclusive of gravity, etc., for comparison, it is difficult to detect such a slight difference.

SUMMARY OF THE INVENTION

An object of this invention is to provide an abnormal load detection method capable of accurately detecting a subtle abnormal load caused, e.g., by adhesion to a weld.

To achieve the above object according to the present invention, an estimated disturbance torque, detected by a disturbance estimation observer immediately before a machine's movable part is moved, is stored, and it is determined that an abnormal load is applied when the value obtained by subtracting the stored estimated disturbance torque from an estimated disturbance torque detected by the disturbance estimation observer, while the movable part of the machine is in motion, is greater than or equal to a preset value.

Preferably, the estimated disturbance torque, detected by the disturbance estimation observer immediately before the machine's movable part is moved, is stored, and it is determined that an abnormal load is applied when the value obtained by subtracting the stored estimated disturbance torque from an estimated disturbance torque detected by the disturbance estimation observer during a predetermined period of time after the movable part starts moving is greater than or equal to the preset value.

Still preferably, the estimated disturbance torque detected by the disturbance estimation observer immediately before an arm of a spot welding robot is moved, is stored, and it is determined that an abnormal load is applied when the value obtained by subtracting the stored estimated disturbance torque from an estimated disturbance torque detected by the disturbance estimation observer, during the predetermined period of time after the arm starts moving, is greater than or equal to the preset value.

Thus, according to the present invention, the force acting on the machine's movable part, and not including gravity or frictional force, is estimated, based on the difference between an estimated disturbance torque detected during movement of the machine's movable part and a disturbance torque estimated immediately before the machines movable part is moved, and when the difference becomes greater than or equal to an abnormal load detection reference value, it is determined that an abnormal load is applied. Accordingly, the reference value, which is used as a criterion for detecting an abnormal load, can be set to a small value with accuracy. Thus, an abnormal output torque of a servomotor for driving the movable part, caused by adhesion of the movable part or collision of the same to an obstacle, can quickly be detected, and an abnormal load resulting from the adhesion, collision or the like can be accurately detected without damaging the machine's movable part or workpiece.

In the case of the present invention, the abnormal load detection processing is executed only for a predetermined time after the start of movement of the movable part of the machine in such a manner that an abnormal load is detected only during a period in which the gravity and frictional force acting on the movable part have not undergone any substantial change after the start of the movement, so that the abnormal load detection reference value can be set to a small value with accuracy, whereby an abnormal load caused by adhesion or the like can accurately be detected and erroneous detection can be eliminated.

BEST MODE OF CARRYING OUT THE INVENTION

An outline of this invention will be first described. While a movable part of a machine, such as a robot arm, is at rest, a servomotor or the like for actuating the machine movable part produces a force resisting an external force such as gravity so as to maintain a stationary state. Thus, an estimated disturbance torque, the torque variation due to an abnormal load, detected by a disturbance estimation observer immediately before the machine movable part is moved represents a value of force resisting gravity or frictional force. Accordingly, the disturbance torque is estimated and stored by the disturbance estimation observer immediately before the machine movable part is moved, and when a predetermined time has elapsed after the start of movement of the machine movable part, the stored disturbance torque is subtracted from an estimated disturbance torque which is newly detected by the disturbance estimation observer, so that the resulting value can be estimated to be the value of the torque acting on the movable part and not including gravity or kinetic frictional force. If the value obtained indicates a torque value greater than or equal to a preset value that does not normally occur, it is determined that an abnormal load is applied. Thus, in the case of a robot such as a spot welding robot, an abnormal load caused by the adhesion of the distal end of the spot gun to a workpiece can be reliably detected without fail.

Figure 3:
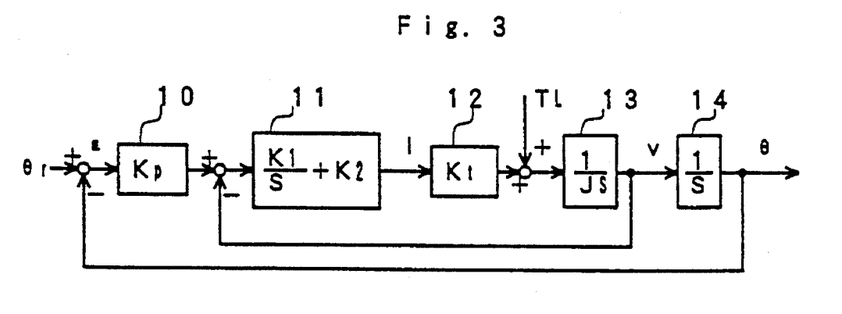
FIG. 3 is a block diagram of a servomotor control system.

FIG. 3 is a block diagram of a servomotor control system for a robot or the like, wherein proportional (P) control is executed with respect to position, while proportional-plus-integral (PI) control is executed with respect to velocity. Symbol KP of a transfer function 10 represents a proportional gain of a position loop, and 11 represents a transfer function of a front-end compensator of a velocity loop, in which K1 and K2 are an integral constant and a proportional constant, respectively. Reference numerals 12 and 13 represent transfer functions of a motor respectively, while Kt is a torque constant, and J is an inertia. Reference numeral 14 denotes a transfer function, in which a velocity v is integrated to obtain a position θ, and TL represents a disturbance torque.

A feedback value representing a present position θ is subtracted from a position command value θr, and the obtained difference, i.e., position deviation ε (=θr −θ), is multiplied by the proportional constant KP to obtain a velocity command value. Using the difference (velocity deviation) between the velocity command value and actual velocity v, PI control is executed to obtain a current value I as a torque command value. The current I is passed through the winding of the motor to thereby drive the motor. Thus, the motor is rotated at the velocity v, and this velocity v is integrated to obtain the position θ.

A disturbance estimation observer is incorporated in the servomotor shown in FIG. 3. First, referring to digital servo control in which servo control for a servomotor is executed by a processor, a conventionally employed disturbance estimation observer will be explained.

Figure 4:
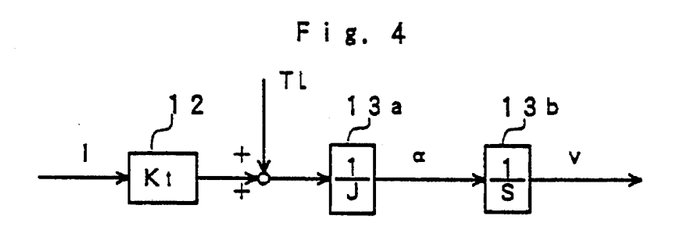
FIG. 4 is a block diagram of a model in which a disturbance estimation observer is incorporated.

FIG. 4 is a block diagram of a model as an observation subject in a servomotor. Reference numeral 12 represents the transfer function of the torque constant Kt of the servomotor, shown in FIG. 3, and 13a and 13b represent a transfer function of the inertia J and an integral term, respectively, which altogether correspond to the transfer function 13 in FIG. 4, I is an input torque command, and v and TL are a velocity and a disturbance torque, respectively, as state variables.

In the model of FIG. 4, the state equation for the state variables v and TL is given as follows:

$$\begin{bmatrix} \dot{\alpha} \\ \dot{TL} \end{bmatrix} = \begin{bmatrix} 0 & 1/J \\ 0 & 0 \end{bmatrix} \begin{bmatrix} v \\ TL \end{bmatrix} + \begin{bmatrix} Kt/J \cdot I \\ 0 \end{bmatrix} \quad (1)$$

In equation (1), α represents an acceleration, and TL with a dot above represents the rate of change of disturbance torque; however, disturbance torque TL is assumed to be zero due to the reason that it will not undergo any change in a short period of time.

Figure 5:
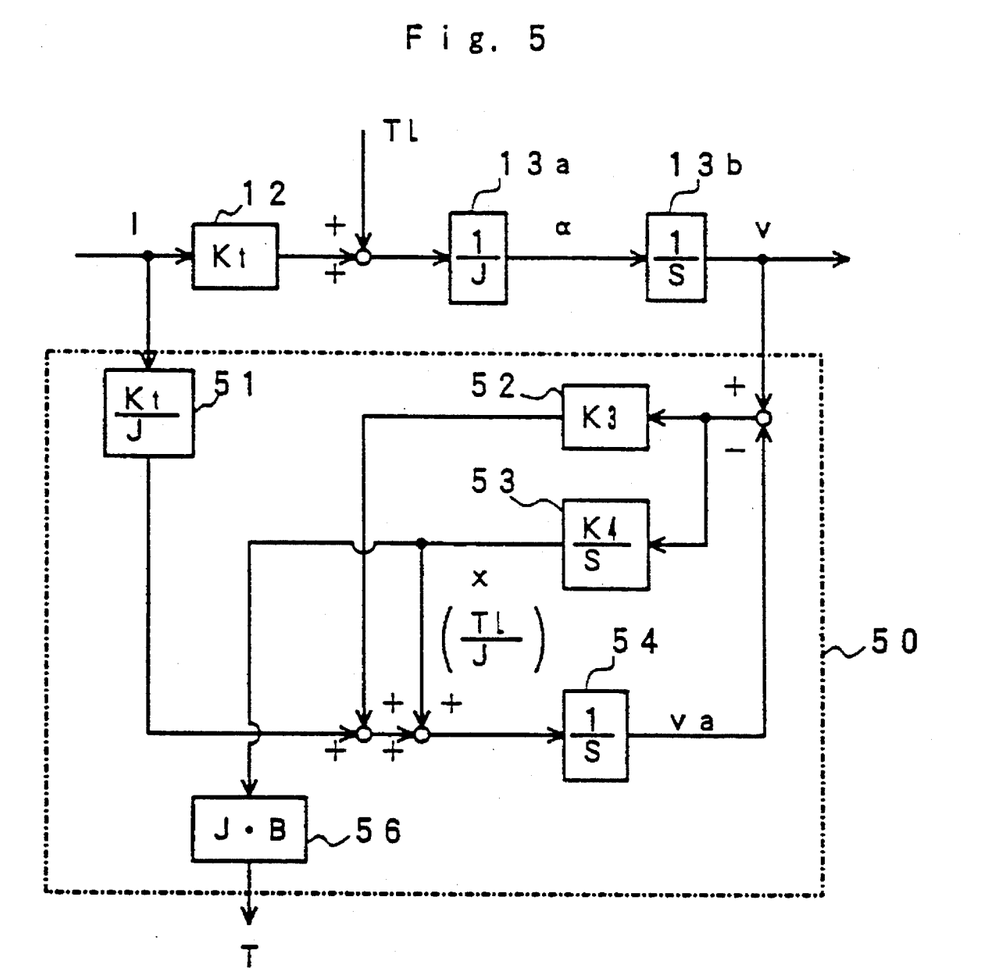
FIG. 5 is a block diagram showing an example of the disturbance estimation observer.

From equation (1), and using a general procedure for creating an observer, an observer 50 of identical dimension for estimating the velocity v and the disturbance TL is obtained, as shown in FIG. 5. In the disturbance estimation observer 50, K3 and K4 in terms 52 and 53 are parameters of the disturbance estimation observer, while a term 51 represents a parameter value, which is multiplied by the current value I as the torque command, which is actually outputted to the servomotor and is obtained by dividing the torque constant Kt by the inertia J. Reference numeral 54 denotes an integral term.

Analyzing the block diagram of FIG. 5 provides $$\{I \cdot Kt + TL\}\{1/(J \cdot S)\} = v \quad (2)$$

and $$\{I \cdot (Kt/J) + (v-va)K3 + (v-va)(K4/s)\}(1/S) = va \quad (3)$$

(where va is the output of the integral term 54 and represents an estimated velocity).

From equation (2), $$I = (v \cdot J \cdot S - TL)/Kt \quad (4)$$

Substituting equation (4) into equation (3), followed by rearrangement, provides $$(v \cdot J \cdot S - TL)/J + (v-va)K3 + (v-va)(K4/S) = va \cdot S \quad (5)$$

From equation (5), $$S(v-va) + (v-va) \cdot K3 + (v-va) \cdot (K4/S) = TL/J \quad (6)$$

Then, from equation (6), $$(v-va) = (TL/J) \cdot [1/\{S + K3 + (Kt/S)\}] \quad (7)$$

Using equation (7), the output x of the term 53 is given by the following equation (8):

$$\begin{aligned} x &= (v - va) \cdot (K4/S) \quad (8) \\ &= (TL/J) \cdot \{K4/(S^2 + K3 \cdot S + K4)\} \end{aligned}$$

In equation (8), the parameters K3 and K4 are selected so that their pole is stabilized, then x can be approximated as follows:

x=TL/J

The value x (=TL/J) is multiplied by the parameter J·B of a term 56 (J is the inertia, and B is a constant for the conformity of unit system), whereby an estimated disturbance torque T substantially equal to the disturbance torque TL can be obtained.

Immediately before the robot arm (machine movable part) is moved, the disturbance torque T (=T0) estimated by the disturbance estimation observer 50 is stored, and after the robot arm is moved, an estimated disturbance torque T (=T1) is obtained in a similar manner. The estimated disturbance torque T0 obtained immediately before the movement is subtracted from the estimated disturbance torque T1 obtained after the movement. The difference obtained (=T1−T0) can be considered to be an estimate representing the true disturbance acting on the robot arm and being free from the influence of gravity, kinetic friction or the like, dependent on the orientation of the robot immediately before the movement of the arm.

Figure 1:
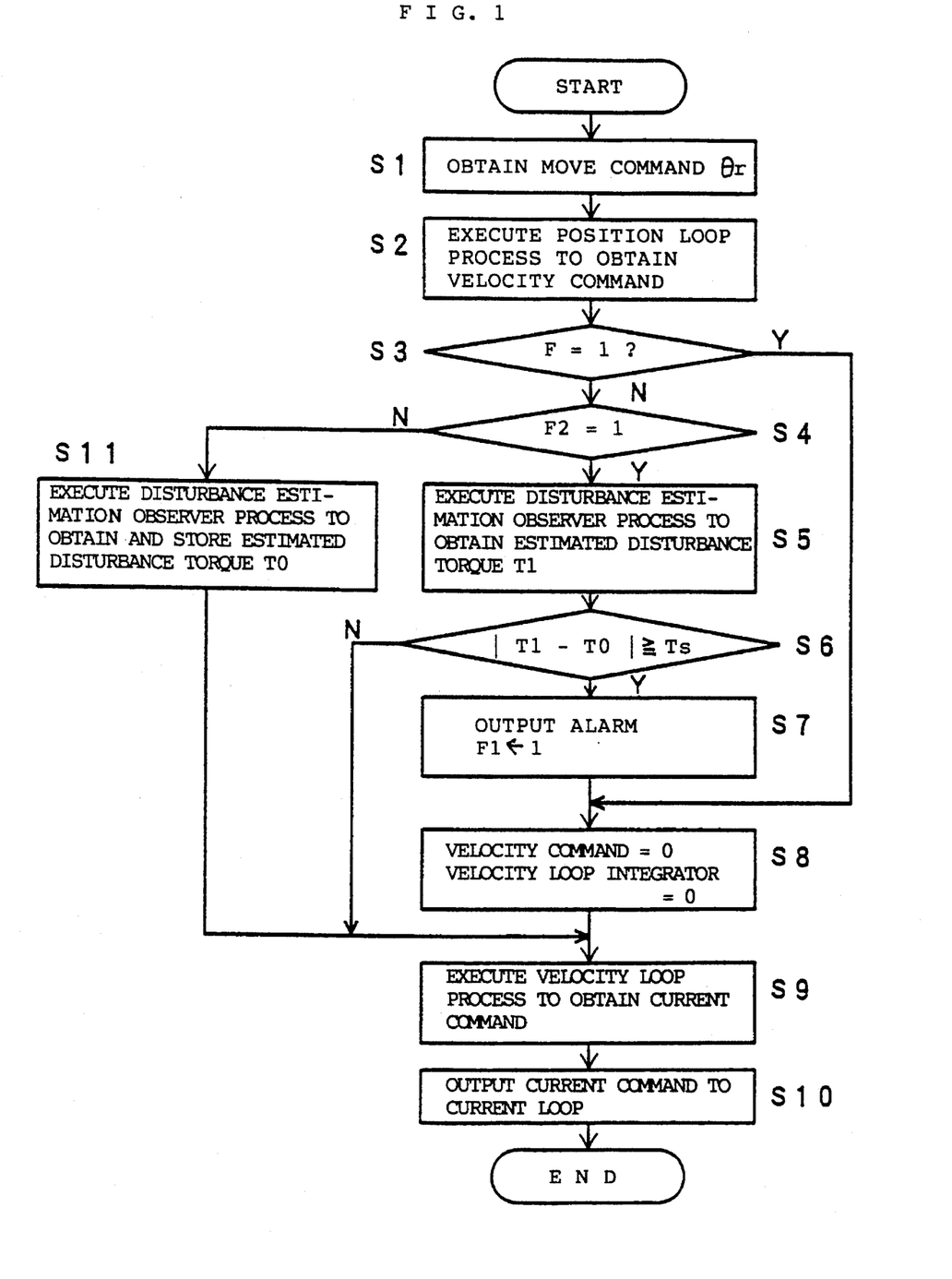
FIG. 1 is a flowchart illustrating a first embodiment of the present invention.
Figure 2:
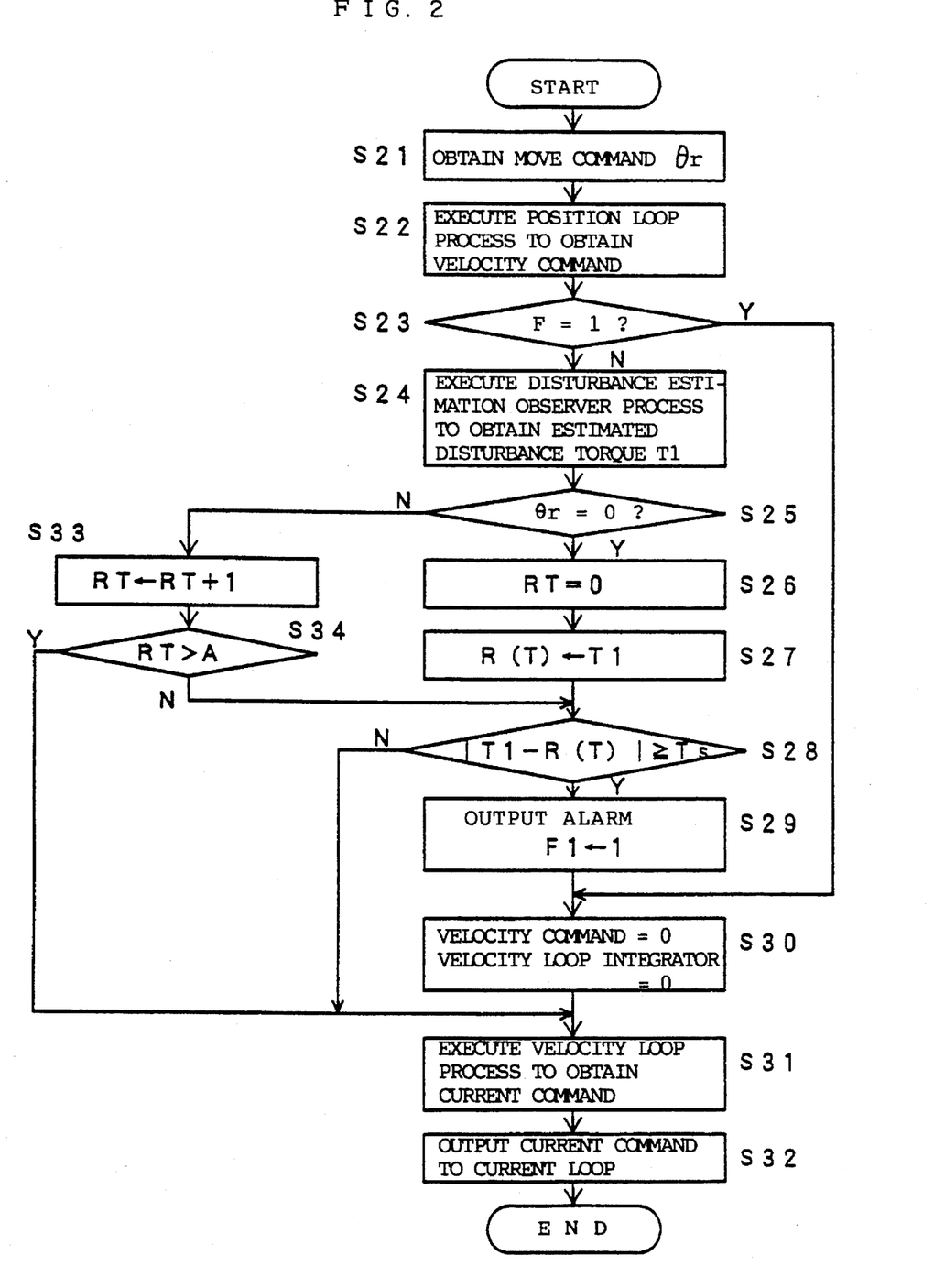
FIG. 2 is a flowchart illustrating a second embodiment of the present invention.
Figure 6:
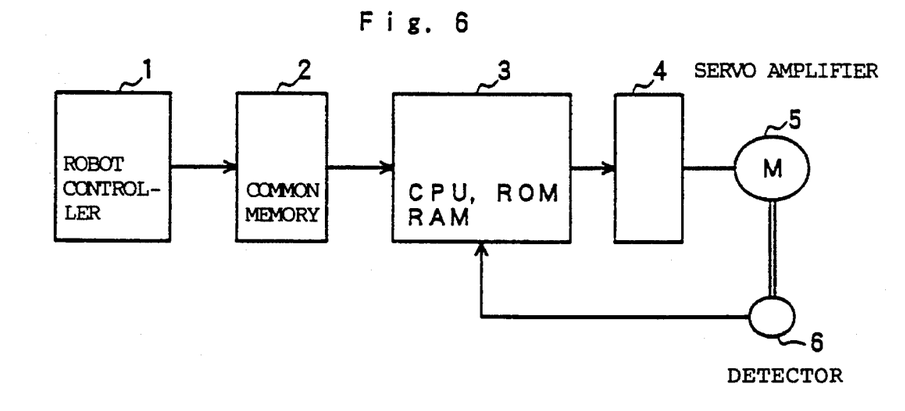
FIG. 6 is a block diagram of a digital servo system for carrying out the embodiments of the present invention.

FIG. 6 is a block diagram of a principal part of a robot control device for carrying out an embodiments of the present invention shown in FIGS. 1 and 2. Reference numeral 1 denotes a controller for controlling a robot. The controller 1 outputs a move command and various control signals to a digital servo circuit 3 through a common memory 2. The digital servo circuit 3 comprises a processor (CPU), a ROM, a RAM, etc., digitally carries out servo control on position, velocity, etc., and outputs a current command to a servo amplifier 4. The servo amplifier comprises a transistor inverter or the like, to control a servomotor 5 associated with an individual axis. Reference numeral 6 denotes a detector for detecting position and velocity. The position/velocity detector 6 comprises a pulse coder or the like mounted to the shaft of the servomotor, and outputs position/velocity feedback signals to the digital servo circuit 3. Although FIG. 6 illustrates only one servo system associated with one axis, each of the other axes has a similar arrangement, and their configuration is identical with that of a conventionally known digital servo circuit.

FIG. 1 is a flowchart of a processing according to a first embodiment of the present invention, which is executed by the processor of the digital servo circuit at intervals of a position/velocity loop processing period.

The controller 1 distributes move commands to the respective axes in accordance with a taught work motion program, sets a Flag F2 in the common memory 2 to "1" each time the output of the move command is started, and resets the flag F2 to "0" when a preset very short period of time A has elapsed after the start of the output of the move command. The controller 1 repeats this processing.

Based oil the move command output from the controller 1, the processor (CPU) of the digital servo circuit 3 obtains a move command θr for each position/velocity loop processing period (Step S1), and carries out a position loop processing, based on a present position (position feedback value) detected by the position/velocity detector 6 mounted on the servomotor, in a manner similar to that of the conventional system, to calculate a velocity command (Step S2). Subsequently, it is determined whether a flag F1, which is set to "1" when an abnormal load is detected, is "1" (Step S3). This flag F1 is set to "0" by initialization, and the value "0" is retained until an abnormal load is detected. If the flag F1 is not "1", it is determined whether the aforesaid flag F2 is "1" (Step S4). If, for example, no move command is outputted from the controller 1 and thus the flag F2 is not "1", the program proceeds to Step S11, wherein the processing of the disturbance estimation observer 50 shown in FIG. 5 is executed to obtain an estimated disturbance torque, which is then stored as the disturbance torque T0 estimated during stoppage of the robot. Then, a velocity loop processing is executed to obtain a current command (torque command), which is then delivered to a current loop (Steps S9 and S10), and the present position/velocity loop processing is ended.

Thereafter, the processor of the digital servo circuit 3 repeatedly executes Steps S1 to S4, S11, S9, and S10 until the controller 1 outputs a move command and the flag F2 is set to "1", whereby the disturbance torque T0, estimated during stoppage of the machine movable part, is successively updated. In this case, since no move command is outputted yet, the robot is in a stationary state, while the servomotors of the respective axes of the robot produce a force resisting gravity, frictional force and the like, which are dependent on the orientation of the robot. Thus, the estimated disturbance torque T0 represents a torque equivalent to the sum of such gravity and the frictional force.

When a move command is outputted from the controller 1, and the flag F2 is set to "1", the processor executes Steps S1 through S4, and the flow of the processing proceeds from Step S4 to Step S5, wherein the processing of the disturbance estimation observer is carried out to obtain the estimated disturbance torque T1. It is then determined whether the absolute value of the difference between this estimated disturbance torque T1 and the stored disturbance torque T0, estimated before the start of the movement (the disturbance torque estimated immediately before the movement), is larger than or equal to a preset abnormal load detection reference value Ts (Step S6). If the absolute value is smaller than Ts, the program proceeds to Step S9, in which the velocity loop processing is carried out using the velocity command obtained in Step S2 and the velocity feedback signal detected by the position/velocity detector 6, as in a conventional system, to obtain a current command, and the obtained current command is delivered to the current loop (Step S10), thereby terminating the processing for the present processing period.

In subsequent processing cycles, as long as the flag F2 remains "1" (Step S4) because the predetermined time A has not yet elapsed from the start of the movement, and when it is determined in Step S6 that the absolute value of the difference between the estimated disturbance torque T1 and the stored disturbance torque T0, estimated immediately before the movement, is smaller than the reference value Ts, the program repeatedly follows the course of Steps S1 through S6, S9, and S10. If, however, it is determined in Step S6 that the absolute value of the difference between the estimated disturbance torque T1 and the stored disturbance torque T0, estimated before the start of the movement is larger than or equal to the preset reference value Ts, that is, if the load excluding gravity, frictional force, etc. (T0) is greater than or equal to the reference value Ts, it is inferred that an abnormal load is being applied due to adhesion or collision of a spot gun or other causes, whereupon an alarm is outputted, and the flag F1 is set to "1" (Step S7). Then, the velocity command obtained in Step S2 is canceled to make the velocity command zero, and an integrator in the velocity loop processing is set to "0" (Step S8). The program then proceeds to Step S9 to carry out the velocity loop processing, but, since both the velocity command and the integrator of the velocity loop are set to "0", an electric current to stop the motor will be generated.

From the subsequent cycle on, since the flag F1 has already been set to "1", the program proceeds from Step S3 to S8, whereby the velocity command and the integrator of the velocity loop are both set to "0", and the velocity loop processing is carried out to obtain a current command, which is then delivered to the current loop to stop the robot.

When no adhesion of the spot gun or the like occurs, and thus it is determined in Step S6 that the absolute value of the difference between the estimated disturbance torque T1 and the stored disturbance torque T0, estimated before the start of the movement, is smaller than the preset value Ts, Steps S1 through S6, S9, and S10 will be repeatedly executed at intervals of the processing period, and when the preset time A has elapsed after the start of output of the move command, the controller 1 resets the flag F2 to "0". In this case, after executing Steps S1 to S4, the processor of the digital servo circuit 3 executes Step S11 in which an estimated disturbance torque T0 is obtained and stored, and will not execute the processing of Steps S5 through S8 (the processing for obtaining an estimated disturbance torque T1).

That is, the abnormal load detection processing is carried out only during the predetermined very short period of time A following the start of the movement, because an abnormal load, caused, e.g., by adhesion of the spot gun, can be detected in such a short period of time immediately after the start of the movement. Since the influence of gravity changes as the orientation of the robot is changed, if the abnormal load detection reference value Ts is too small, the estimated disturbance torque T1 becomes too large, depending on the orientation of the robot, thereby causing the fear such that even a normal load may erroneously be determined to be abnormal. If, on the other hand, the reference value Ts is too large, even an abnormal load that may occur during the period other than the predetermined short period of time A can also be detected; however, when a force deriving from adhesion of the spot gun or the like is not large enough, such adhesion cannot be detected. Therefore, in the case of a robot motion wherein the orientation of the robot does not significantly change, and the influence of the gravity is not specially large within one stroke of movement (from one stationary position to the next of the robot), the predetermined time period A may be set to a time required for the stroke of movement of the robot (the period of time from the start of a move command until the move command becomes "0").

After the predetermined period of time A has passed, and the flag F2 is reset to "0", the estimated disturbance torque T0 is obtained and stored in Step S11, even while the robot is moving. No inconvenience, however, will arise, because the estimated disturbance torque T0 is successively updated; more specifically, when the robot makes a motion after stopping for a while, the disturbance torque T0 estimated immediately before the start of the motion is retained.

FIG. 2 is a flowchart of a processing according to a second embodiment of the present invention, which is executed by the processor of the digital servo circuit 3 at intervals of the position/velocity loop processing period.

The difference between the first and second embodiments resides in the fact that in the first embodiment, the period for which the abnormal load detection processing is carried out is determined by means of the flag which is set and reset by the robot controller 1 whereas, in the second embodiment, the abnormal load detection period is determined by the processor of the digital servo circuit 3.

Steps S21 to S23 are identical with Steps S1 to S3 of the first embodiment. More particularly, a move command from the controller 1 is read, the position loop processing is carried out to obtain a velocity command θr and it is determined whether the flag F1 is "1". If the flag F1 is not "1", the program proceeds to Step S24, wherein the processing of the disturbance estimation observer is executed to obtain an estimated disturbance torque T1. It is then determined whether the move command θr obtained in Step S21 is "0", i.e., whether or not the move command is being output (Step S25), and if no move command is outputted, a timer RT is reset to "0" (Step S26), and the estimated disturbance torque T1 (=T0) obtained in Step S24 is stored in a register R(T) (Step S27). Subsequently, it is determined whether the absolute value of the difference between the estimated disturbance torque T1 obtained in Step S24 and the value stored in the register R(T) is larger than or equal to the abnormal load detection reference value Ts (Step S28). In this case, the absolute value is "0" and in no way is greater than the reference value Ts, and, accordingly, the program proceeds to Step S31, wherein the velocity loop processing is carried out to obtain a current command, and then to Step S32 wherein the obtained current command is delivered to the current loop. While no move command is outputted, and thus the robot is at rest, Steps S21 through S28, S31, and S32 are repeatedly executed at intervals of the processing period.

When a move command is outputted (θr≈0), the program proceeds from Step S25 to S33, wherein "1" is added to the value in the timer RT. It is then determined whether the value of the timer RT is greater than the preset very short period of time A (Step S34), and, if not, the program proceeds to Step S28. In this case, the register R(T) is loaded with the disturbance torque T1 (=T0) estimated immediately before the start of movement of the robot. Consequently, if the disturbance torque estimated immediately before the start of the movement and stored in the register R(T) is subtracted from the currently estimated disturbance torque T1 detected in Step S24 (Step S28), then the resulting difference represents a true force acting on the robot arm and not including gravity or the frictional force. If the difference is greater than or equal to the preset reference value Ts, it is concluded that an abnormal load is being applied, while if the difference is smaller than the reference value Ts, it is concluded that the applied load is normal. When the applied load is normal, the program proceeds from Step S28 to S31, whereupon the velocity loop processing is carried out to obtain a current command, and the obtained command is outputted to the current loop (Steps S31 and S32). Thereafter, Steps S21 through S25, S33, S34, S28, S31 and S32 are repeatedly executed until the value of the timer RT becomes greater than the preset value A; when it has become greater, the program proceeds from Step S34 to S31, without executing the processing of Step S28.

If it is determined in Step S28 that the difference between the currently estimated disturbance torque T1 and the disturbance torque, estimated immediately before the start of the movement and stored in the register R(T), is greater than or equal to the preset reference value Ts, it is concluded that an abnormal load is being applied. Thus, the program proceeds from Step S28 to S29 wherein an alarm is outputted, and the flag F1 is set to "1". Then, the velocity command and the integrator of the velocity loop are both set to "0". As a result, a current command is outputted to stop the servomotor, whereby the rotation of the servomotor and the operation of the robot are stopped. In the subsequent cycle on, since the flag F1 is set to "1", Steps S21 to S23, S30, S31, and S32 are executed at intervals of the processing period.

Also, in a variation to the second embodiment, in a third embodiment, the period in which an abnormal load is detected is not limited to the predetermined time period A, and instead an abnormal load may be detected throughout the period of the movement of the robot. In this case, Steps S26, S33 and S34 of FIG. 2 are unnecessary, and the processing flow may be configured so that, when it is determined in Step S25 that the move command θr is not "0", the program proceeds to Step S28.

In the case of a spot welding robot or the like, the processing for detecting an abnormal load caused by adhesion to a weld or the like may be executed with respect only to an axis which moves the robot arm after completion of spot welding, e.g., an axis for moving the arm back and forth.

Furthermore, this invention can be applied not only to robots but also to machines of the type in which a machine operating part is driven by a servomotor, such as machine tools.

We claim:

1. An abnormal load detection method for a machine having a movable part, said method comprising the steps of:

subjecting the machine movable part to operation control by a servomotor control system, such that a position of the movable part is subject to proportional control, while a velocity of the movable part is subject to proportional-plus-integral control;

detecting a first estimated disturbance torque, by a disturbance estimation observer, immediately before the movable part is moved, and storing the first estimated disturbance torque as a stored estimated disturbance torque;

detecting a second estimated disturbance torque, by the disturbance estimation observer, within a predetermined period of time after the movable part starts moving;

subtracting the stored estimated disturbance torque from the second estimated disturbance torque, to generate a difference value;

determining that an abnormal load is applied when the difference value is at least as great as a preset value; and canceling a velocity command obtained by a position loop processing to obtain a zero velocity command and setting an integrator in a velocity loop processing to zero when the difference value is at least as great as the preset value.

2. A device for detecting an abnormal load on a moving part of a machine, said device comprising:

disturbance estimation observer means for determining a first estimated disturbance torque immediately prior to movement of the moving part and a second estimated disturbance torque while the moving part is in motion;

storage means for storing said first estimated disturbance torque as a stored estimated disturbance torque;

determination means for determining a difference between said stored estimated disturbance torque and said second estimated disturbance torque, and based on the difference, determining whether the abnormal load has been applied to the moving part; and servomotor control means, having an integrator, for controlling the moving part, wherein a position of the movable part is subject to proportional control and a velocity of the movable part is subject to proportional-plus-integral control, said servomotor control means canceling a velocity command, obtained by position loop processing, to the moving part, and setting the integrator in a velocity loop processing to zero when said determination means determines that the abnormal load has been applied to the moving part.

3. The device according to claim 2, wherein the machine movable part comprises an operating part of a machine tool, the operating part being driven by a servomotor.

4. The device according to claim 2, further comprising:

alarm means for outputting an alarm when said determination means determines that the abnormal load has been applied to the moving part.

* * * * *

UNITED STATES PATENT AND TRADEMARK OFFICE
CERTIFICATE OF CORRECTION

PATENT NO. : 5,493,192
DATED : February 20, 1996
INVENTOR(S) : Ryo NIHEI et al.

It is certified that error appears in the above-indentified patent and that said Letters Patent is hereby corrected as shown below:

Title page;
Item [30], in the FOREIGN PATENT DOCUMENTS, first entry, change

"3810691A1" to -- DE 3810691A1--.

Column 4, line 16, after "motor" insert --,--; and line 23, change "$(=\theta r -\theta)$" to --$(= \theta r - \theta)$--.

Column 6, line 16, delete "oil" and insert --on--.

Column 8, line 21, after "that" insert --,--; and line 54, change "$(\theta r \approx 0)$" to --$(\theta r \neq 0)$--.

Signed and Sealed this

Thirtieth Day of July, 1996

Attest:

BRUCE LEHMAN

*Attesting Officer*  Commissioner of Patents and Trademarks